United States Patent Office 3,044,664
Patented July 17, 1962

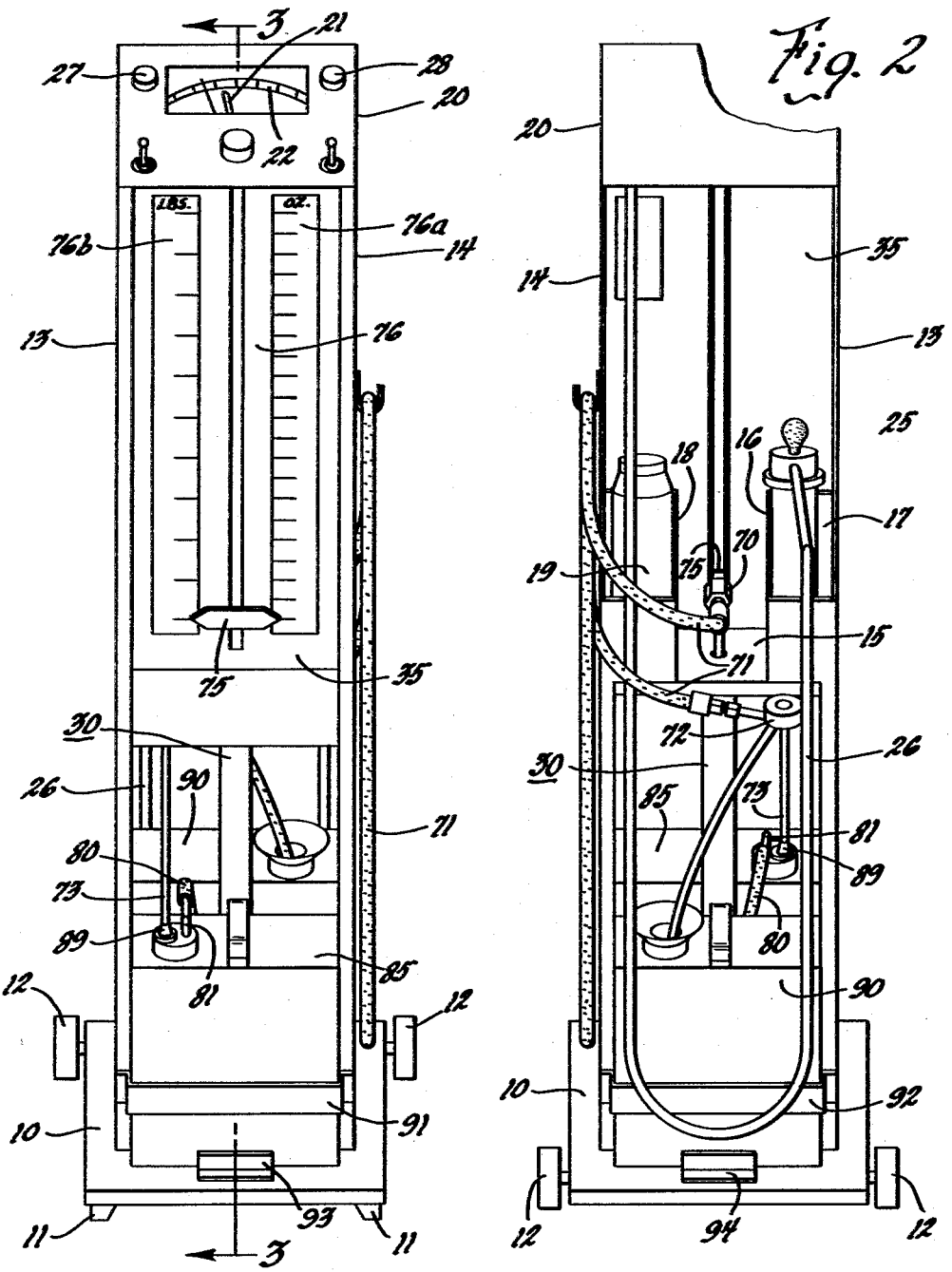

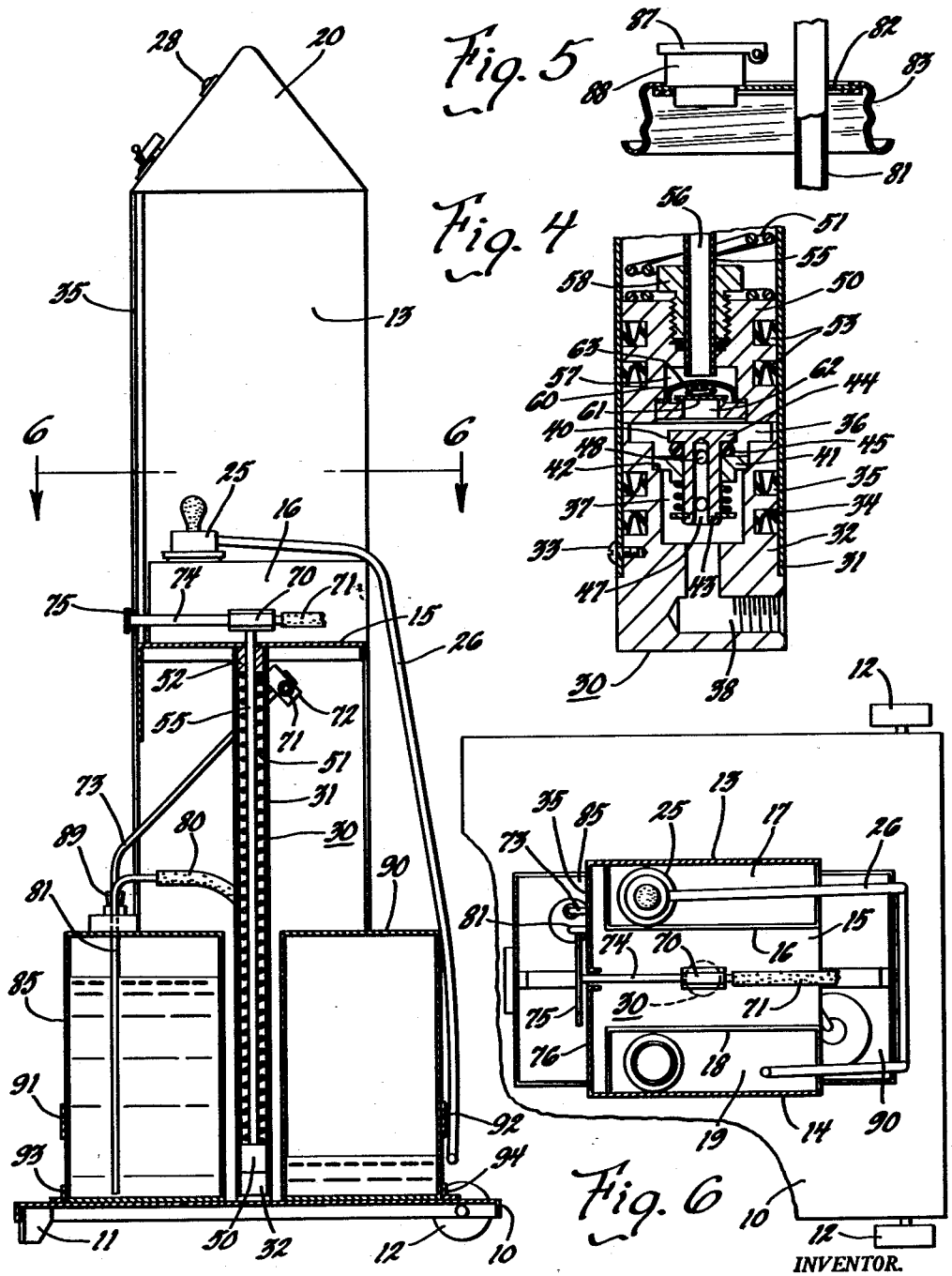

3,044,664
BRAKE SYSTEM TESTING AND FILLING APPARATUS
Francis J. Markey, Lewisburg, Ohio, assignor to General Motors Corporation, Detroit, Mich., a corporation of Delaware
Filed May 12, 1960, Ser. No. 28,715
3 Claims. (Cl. 222—47)

This invention relates to liquid dispensing apparatus for dispensing liquid under pressure in controlled or indicable volume, the dispensing apparatus being also adapted for use to pressure test a hydraulic system. More specifically the apparatus is adapted for pressure testing, filling and purging a hydraulic brake system for a motor vehicle under controlled conditions to provide for admission of clean brake fluid into the brake system for a vehicle.

There is a growing recognition that the hydraulic brake fluid in a hydraulic brake system on a motor vehicle becomes dirty over a period of time such that excessive wear of various operating seals in the master cylinder of a brake system and in the wheel cylinders of the brake system wear abnormally, and have less than normal useful life. There is also recognition that the boiling point of brake fluids in hydraulic brake systems in use on motor vehicles decreases over a period of use in the hydraulic brake system, which low boiling point fluids result in vapor lock in the wheel cylinders of the hydraulic brake system and cause faulty brake operation, even to the extent of brake failure because insufficient force is capable of being transmitted through the vaporous materials in the wheel cylinder to give adequate braking force to the brake shoes of the hydraulically operated brakes.

Because of increasing demands on the brake system on motor vehicles resulting from the increased weight of the vehicles and greater horsepower in the engines, the horsepower that must be dissipated by the brakes in a braking operation has increased greatly so that the brakes are constantly operating at increasingly high temperatures. It is well-known that if the boiling point of a brake fluid is not sufficiently high, the brake fluid will vaporize under operating conditions to the extent that vapors or gases are created in the wheel cylinders of the hydraulic brakes when the temperature of the wheel cylinders rises above the boiling point of the brake fluid in the wheel cylinders. These gases in the wheel cylinders of the hydraulic brake system produce what is known as "vapor lock" which prevents full force transmission to the brake shoes from the master cylinder of the hydraulic brake system. These gas bubbles in the wheel cylinders are compressible so that much of the hydraulic force emanating from the last cylinder is dissipated in compression of the volume of gas in the wheel cylinders so that considerable braking force is lost in transmission to the brake shoes.

It therefore becomes more essential that the boiling point of the brake fluid in a hydraulic brake system be maintained at a sufficiently high value that it will not vaporize the gas supply in the wheel cylinders even under abnormal braking conditions so that a true column of hydraulic fluid is constantly available for transmission of the braking force from the master cylinder to the wheel cylinders of the hydraulic brake system.

There are many factors which cause hydraulic brake fluid to reduce in its boiling point over a period of time of use in a hydraulic brake system. One of the more important and readily segregated causes for dropping of the boiling point of hydraulic brake fluid in use in a brake system is the hygroscopic character of brake fluids, and their willingness to absorb moisture. Since there is a certain amount of breathing in the hydraulic brake system during reciprocation of the piston in the master cylinder and in reciprocation of the pistons in the wheel cylinders, moisture in small quantities is drawn into the brake system that is absorbed by the oil because of its hygroscopic character. Gradually the moisture absorbed by the hydraulic brake fluid is in sufficient volume that the boiling point of the hydraulic brake fluid falls considerably below the established boiling point of clean new hydraulic brake fluid. It is this moisture in the hydraulic brake fluid that causes considerable difficulty in the vaporization of the liquid in the wheel cylinders, and also causes a considerable amount of corrosion of the metal parts of the hydraulic brake system, particularly as to the pistons and cylinders.

It is therefore the purpose of this invention to provide a portable type apparatus that is readily movable from place to place, that is from one automobile to another, to arrange for convenient filling of the master cylinder of the hydraulic brake system with clean new fluid, and if necessary to completely purge all hydraulic brake fluid from the brake system and resupply or refill the brake system with all new clean hydraulic brake fluid.

It is another purpose of the invention to provide a portable type apparatus that is capable of being used to pressure test a hydraulic brake system to determine whether or not there are fluid leakages in the system and to provide for pressure filling of the hydraulic brake system when bleeding or purging the brake system of brake fluid having an unsatisfactory low boiling point.

It is another object of the invention to provide apparatus of the type set forth in the foregoing objects wherein there is provided a reciprocating type piston pump adapted to receive hydraulic brake fluid from a suitable fresh supply source to place the hydraulic fluid under pressure in the piston pump and retain the hydraulic fluid under pressure in the piston pump until dispensed under control of a dispensing nozzle and valve, the volume of hydraulic fluid dispensed being indicated on a scale so that the operator of the apparatus will know the total volume of hydraulic fluid dispensed into a brake system either for filling, bleeding or complete purging of the system.

It is another object of the invention to provide apparatus having the features of the foregoing objects wherein the piston pump retains the hydraulic fluid under pressure in the pump so that the outlet conduit from the pump can be connected with a hydraulic brake system to thereby apply the hydraulic pressure from the pump to the hydraulic brake system and thereby determine if there is any leakage of hydraulic fluid from the brake system.

Further objects and advantages will be apparent from the drawings and the description.

In the drawings:

FIG. 1 is a front elevational view, somewhat in perspective, illustrating apparatus incorporating features of this invention.

FIG. 2 is an elevational view of the apparatus shown in FIG. 1, also somewhat in perspective, showing the apparatus from the rear side.

FIG. 3 is a cross-sectional view of the apparatus of FIG. 1 taken substantially along line 3—3 of FIG. 1.

FIG. 4 is a vertical transverse cross-sectional view of the piston pump for the apparatus illustrating the intake and discharge or discharge check valve for the pump.

FIG. 5 is a transverse cross-sectional view through a closure cup provided for retaining a receptacle containing new hydraulic fluid closed when the apparatus is not in use.

FIG. 6 is a horizontal cross-sectional view taken along line 6—6 of FIG. 3.

In this invention the apparatus consists of a platform 10 of general planar character. The platform 10 is of a square configuration, as shown on FIGS. 1, 2 and 6. Also, the platform has a pair of legs 11 provided on one side of the platform and has a pair of wheels 12 carried at the opposite side of the platform so that the apparatus can be wheeled from one place to another by an operator.

A pair of uprights or sidewalls 13 and 14 are secured to the platform 10 by any suitable manner such as welding or bolting. These sidewalls 13 and 14 extend vertically upwardly from the platform 10 in spaced horizontal relationship, the walls also being generally parallel one to the other. The walls 13 and 14 are interconnected by a horizontally disposed wall 15 positioned approximately midway between the top and bottom ends of the sidewalls 13 and 14. This wall 15 is suitably secured to the sidewalls 13 and 14 by welding or bolting. The wall 15 cooperates with a vertically positioned wall 16 to form a chamber or container 17 that has an open top in which tools or other accessories can be placed. Similarly, a vertically extending wall 18 cooperates with the wall 15 and the sidewall 14 to form a chamber space 19 adapted to receive tools or other accessories for use with the apparatus of the invention.

The upper ends of the walls 13 and 14 support a temperature indicating apparatus 20 that is the subject of my copending application S. N. 28,716 filed May 12, 1960. In general, this temperature indicating apparatus includes a temperature responsive mechanism that actuates the temperature indicating needle 21 that rides over the temperature scale 22 to indicate the boiling point of a hydraulic brake fluid that is undergoing test by use of a temperature testing device 25 that is connected electrically with the temperature indicating mechanism through means of the flexible electric cord 26. The temperature indicating device includes a light 27 that remains lighted so long as the brake fluid is not boiling, but when the brake fluid does boil, a light 28 is lighted. This mechanism is more fully described in my aforementioned application for patent.

A piston pump 30 has a cylinder 31 fixedly secured in a vertical position on the platform 10 in any suitable manner, the cylinder extending between the platform 10 and the horizontal wall 15 so as to position the cylinder 31 of the pump substantially in the center of the square configuration of the platform 10 and the square configuration formed by the walls 13, 14 and a front wall 35 of the apparatus.

As more particularly shown in FIG. 4, the cylinder 31 of the pump 30 has its lower end closed by a closure body 32 secured to the cylinder 31 by means of screws 33 of other suitable fastening devices. Annular seals 34 and 35 prevent loss of fluid from the cylinder chamber 36 provided above the body 32.

The body 32 has an inlet valve chamber 37 from which there extends the inlet passage 38 through which liquid is received into the inlet valve chamber 37.

The inlet valve chamber 37 contains an inlet valve 40 that consists of an annular member 41 seated in the shouldered recess 42 in the closure body 32, the annular member 41 carrying a hollow valve element 43 that has an enlarged head 44 retaining an O-ring member 45 between the head 44 and the member 41 so as to provide a valve seat to close against flow of hydraulic fluid from the valve chamber 37 through the axial passage 47 in the stem of the valve member 44 and the transverse port 48. This inlet valve member 40 is the unidirectional flow valve to allow for flow of hydraulic fluid from the passage 38 into the cylinder chamber 36 above the inlet valve 40.

The cylinder 31 of the pump 30 also receives a piston 50 adapted for reciprocation within the cylinder 31 from a position immediately adjacent the inlet valve 40, as shown in FIG. 4, to a position in the upper portion of the cylinder 31. Compression spring means 51 placed between the piston 50 and the upper closure member 52 in the cylinder 31 normally urges the piston to the position shown in FIG. 4.

The piston 50 carries annular seals 53 to prevent loss of fluid past the piston.

The piston 50 is carried on the lower end of a hollow piston plunger rod 55 that provides the passage 56 from a check valve chamber 57 in the piston 50, fluid under pressure being delivered from the cylinder chamber 36 through the passage 56 in the hollow rod 55 in a manner hereinafter described. A retaining nut 58 secures the piston 50 on the rod 55.

The check valve chamber 57 carries a check valve 60 having a valve element 61 closing a port 62 from the cylinder chamber 36, a compression spring 63 holding the check valve on its seat to prevent downward flow of hydraulic fluid from the hollow rod 55 when the piston 50 is manually pulled upwardly against the action of the spring 51.

The upper end of the hollow rod 55 terminates in a fitting 70 that is connected with a flexible rubber conduit 71 that has a dispensing control valve 72 provided on the end of the flexible conduit 71, the valve 72 controlling flow of hydraulic fluid from the cylinder chamber 36 through a discharge valve or nozzle 73.

The opposite end of the fitting 70 on the hollow rod 50 has an extension arm 74 that terminates in a pointer element 75. This pointer element 75 traverses a fluid volume indicating scale 76 that has one scale 76a to indicate volume of fluid dispensed from the pump 30 and a second indicating scale 76b which indicates the pressure applied on the hydraulic fluid in the pump 30 by means of the spring 51, the pressure on the hydraulic fluid in the pump being determined by the degree of compression of the spring 51 and the extent of vertical movement of the piston 50 away from the closure member 32 at the bottom of the pump.

The dispensing scale 76 extends between the vertically positioned sidewalls 13 and 14 and forms the face wall 35 heretofore described, the face wall 35 secured to or a part of the sidewall structure 13 and 14.

The inlet port 38 of the pump 30 has a flexible rubber conduit 80 extending therefrom which terminates in a rigid pipe 81 that extends through an annular closure member 82 provided within the thread cap 83 that is adapted to be placed on a standard container such as a one gallon can of hydraulic brake fluid. The pipe 81 extends to the bottom of the container 85, as shown in FIG. 3, so that when the piston 50 of the pump 30 is pulled upwardly manually by the operator, hydraulic fluid will be withdrawn from the container 85 and thence through the conduit 80 into the passage 38 in the pump 30 and thence through the intake valve 40 to fill the cylinder chamber 36 between the inlet valve 40 and the piston 50 as it is being moved in an upward direction. When the operator releases the plunger rod 50, it is apparent that spring 51 will apply pressure on the fluid in the chamber 36 in proportion to the extent of compression of the spring 51.

Thus, obviously when the discharge conduit 71 from the hollow rod 55 is suitably connected to the hydraulic brake system, the hydraulic pressure in the cylinder chamber 36 will be transmitted through the hollow plunger rod 55 to the brake system, dispensing valve 72 being eliminated at this time, with the result that the pressure applied to the hydraulic brake system will indicate any leakage in the system by hydraulic fluid leaking from a leak point or by movement of the pointer element 75 downwardly on the scale 76 because of loss of hydraulic fluid from the system.

The closure cap 83 for the container 85 has a pivotally mounted closure cap 87 on the closure element 88 adapted to receive the dispensing nozzle 89 when the cap 87 is tilted away from the base member 88 to close the container by the nozzle when the apparatus is not in use.

A second container 90 is also adapted to be supported on the platform 10, the containers 85 and 90 being disposed on opposite sides of the pump 30. This container 90 is adapted to receive unsafe hydraulic fluid that is removed from the brake system, the apparatus thereby providing for a convenient supply of fresh new hydraulic fluid for filling or purging the hydraulic brake system and at the same time providing for a container to receive the unsafe hydraulic brake fluid that is removed from the hydraulic brake system.

Suitable brackets 91 and 92 secured between the sidewalls 13 and 14, together with the brackets 93 and 94, position the containers 85 and 90 on the platform 10 so that they will not slide from the platform when the apparatus is being moved from one automobile to another.

While the embodiments of the present invention as herein disclosed constitute a preferred form, it is to be understood that other forms might be adopted.

What is claimed is as follows:

1. Apparatus for applying and maintaining hydraulic fluid under pressure to a brake system and portably movable by an operator from one automobile to another for pressure testing or filling the brake system thereof, including in combination, a support platform, vertically extending upright members secured to said platform and extending upwardly from the platform, said upright members being in horizontally spaced relationship, a hand operated reciprocating stroke cylinder type liquid pressure piston pump having an operating plunger rod extending from one end of the cylinder of the pump, spring means connected with said plunger rod providing a steady force effect on said piston applied as a steady force on hydraulic fluid drawn into the pump cylinder on stroke movement of the piston from one end of the cylinder to the other and release thereof, said pump being fixedly positioned between said upright members, a graduated measurement scale positioned between said uprights, said plunger rod having a pointer element movable with said rod and movable across said scale to traverse the same and indicate thereby discharge of liquid from said pump, flexible conduit means extending from said pump providing liquid inlet means to said pump from a source of liquid, and other flexible conduit means extending from said pump providing liquid discharge means from said pump to apparatus to which pressurized liquid is applied from said pump.

2. Apparatus for applying and maintaining hydraulic fluid under pressure to a brake system and portably movable by an operator from one automobile to another for pressure testing or filling the brake system thereof, including in combination, a horizontally disposed support platform, vertically positioned wall members secured to said platform and extending vertically upwardly from said platform, said wall members being in horizontally spaced relationship, a hand operated reciprocating stroke cylinder and piston type liquid pressure dispensing pump having an operating plunger rod extending from one end of the cylinder of the pump, spring means in said cylinder acting on said piston therein providing a steady force effect on said piston applied as a steady force on hydraulic fluid drawn into said cylinder on stroke movement of the piston from one end of the cylinder to the other and release thereof, said pump being fixedly secured on said platform in vertical position thereon between said wall members with said plunger rod extending from the top end of the cylinder of the pump, an indicating scale positioned in vertical arrangement between said wall members and forming a front face for said apparatus between said wall members, said plunger rod having a pointer element movable with said rod in vertical direction and movable thereby vertically across said scale to traverse the same and indicate thereby discharge of liquid from said pump and movement of said piston in said cylinder, flexible conduit means extending from said pump providing liquid inlet means to said pump from a source of liquid, and other flexible conduit means extending from said pump providing liquid discharge means from said pump to apparatus to which pressurized liquid is applied from said pump and including a fluid control nozzle on the free end of the said other conduit.

3. Apparatus for applying and maintaining hydraulic fluid under pressure to a brake system and portably movable by an operator from one automobile to another for pressure testing or filling the brake system thereof, including in combination, a support platform, vertically extending wall means secured to said platform and extending upwardly therefrom, said wall means being in horizontally spaced relationship, a pump cylinder secured in vertical position on said platform, a unidirectional flow intake valve in the bottom portion of said cylinder through which liquid flows into said cylinder, a piston in said cylinder reciprocable therein, compression spring means between said piston and the top of said cylinder normally urging said piston into a position adjacent said intake valve, a check valve chamber in said piston containing a unidirectional flow check valve providing for liquid flow in one direction through said piston from the cylinder chamber between said piston and said intake valve, a hollow piston rod carrying said piston having one end in fluid connection with said check valve chamber to receive liquid therefrom for delivery through said rod, the opposite end of said rod extending through the upper end of said cylinder and having a flexible conduit means extending therefrom providing liquid discharge means from said pump to apparatus to which liquid is applied, a graduated measurement scale positioned between said wall means and forming a front face for the apparatus, said plunger rod having a pointer element movable with said rod and piston thereon and movable across said scale to indicate thereby liquid discharged from said pump, and flexible inlet conduit means extending from said cylinder.

References Cited in the file of this patent
UNITED STATES PATENTS

| | | |
|---|---|---|
| 1,534,349 | Albrecht | Apr. 21, 1925 |
| 1,825,013 | Patton | Sept. 29, 1931 |
| 2,837,239 | Scholin | June 3, 1958 |